(12) United States Patent
Egami et al.

(10) Patent No.: US 7,653,466 B2
(45) Date of Patent: Jan. 26, 2010

(54) CONTROL APPARATUS FOR ELECTRIC VEHICLES

(75) Inventors: Tsuneyuki Egami, Gamagori (JP); Keiichi Kawakami, Anjo (JP); Takashi Ogawa, Kariya (JP)

(73) Assignee: DENSO Corporation, Kariya (JP)

( * ) Notice: Subject to any disclaimer, the term of this patent is extended or adjusted under 35 U.S.C. 154(b) by 358 days.

(21) Appl. No.: 11/640,407

(22) Filed: Dec. 18, 2006

(65) Prior Publication Data

US 2007/0145926 A1 Jun. 28, 2007

(30) Foreign Application Priority Data

| Dec. 26, 2005 | (JP) | ............................. 2005-371264 |
| Jun. 2, 2006 | (JP) | ............................. 2006-154182 |
| Nov. 14, 2006 | (JP) | ............................. 2006-308137 |
| Nov. 17, 2006 | (JP) | ............................. 2006-311656 |

(51) Int. Cl.
*G06F 7/00* (2006.01)
*G06F 17/00* (2006.01)
*H02P 7/00* (2006.01)
*H02P 27/04* (2006.01)

(52) U.S. Cl. .......................... 701/22; 318/139; 318/432; 318/802

(58) Field of Classification Search ...................... 701/1, 701/22; 318/432, 798, 799, 800, 801, 805–806, 318/808–810, 268–270, 286, 400.26, 400.28, 318/431, 802, 139; 180/54.1, 65.1, 65.2; 903/925, 940, 942, 943

See application file for complete search history.

(56) References Cited

U.S. PATENT DOCUMENTS

| 7,099,756 | B2 | 8/2006 | Sato |
| 7,212,891 | B2 | 5/2007 | Sato |
| 2002/0110007 | A1 | 8/2002 | Kalman et al. |
| 2004/0145338 | A1 | 7/2004 | Nakamura et al. |

(Continued)

FOREIGN PATENT DOCUMENTS

EP 1000796 A2 5/2000

(Continued)

OTHER PUBLICATIONS

U.S. Appl. No. 11/606,060, filed Nov. 30, 2006.

(Continued)

*Primary Examiner*—Edward Pipala
(74) *Attorney, Agent, or Firm*—Nixon & Vanderhye P.C.

(57) ABSTRACT

A control apparatus for a vehicle controls the input power of an AC motor to reduce the difference between a target value and detected value of the system voltage. When a rotation speed of the AC motor increases to be higher than a predetermined value or when a command value of a torque generated by the AC motor increases to be greater than a predetermined value, a current vector is adjusted to a value on a lagging side in order to control the input power of the AC motor. Thus, an input power operation quantity required for stabilizing the system voltage can be realized with a high degree of reliability. When the rotation speed and the command value decrease, the current vector is adjusted to a value on a leading side in order to control the input power of the AC motor.

20 Claims, 6 Drawing Sheets

U.S. PATENT DOCUMENTS

| | | |
|---|---|---|
| 2004/0145356 A1 | 7/2004 | Kalman et al. |
| 2006/0052915 A1 | 3/2006 | Sato |
| 2006/0247829 A1 | 11/2006 | Sato |
| 2007/0119634 A1 | 5/2007 | Egami et al. |
| 2007/0125582 A1 | 6/2007 | Egami et al. |
| 2007/0126385 A1 | 6/2007 | Egami et al. |
| 2007/0145926 A1 | 6/2007 | Egami et al. |
| 2007/0145927 A1 | 6/2007 | Egami et al. |
| 2007/0194763 A1 | 8/2007 | Egami et al. |

FOREIGN PATENT DOCUMENTS

| | | |
|---|---|---|
| EP | 1 460 756 A1 | 9/2004 |
| EP | 1603224 A | 12/2005 |
| EP | 1 800 934 A2 | 6/2007 |
| EP | 1 800 936 A2 | 6/2007 |
| JP | 2003-259689 | 9/2003 |
| JP | 2005-343750 | 12/2005 |
| JP | 2005-353075 | 12/2005 |
| JP | 2005-353076 | 12/2005 |

OTHER PUBLICATIONS

U.S. Appl. No. 11/606,061, filed Nov. 30, 2006.
U.S. Appl. No. 11/605,456, filed Nov. 29, 2006.
U.S. Appl. No. 11/643,980, filed Dec. 22, 2006.
U.S. Appl. No. 11/653,848, filed Jan. 17, 2007.
U.S. Appl. No. 11/707,903, filed Feb. 20, 2007.
U.S. Appl. No. 11/950,768, filed Dec. 5, 2007 (unpublished).
U.S. Appl. No. 12/068,595, filed Feb. 8, 2008 (unpublished).
Extended EP Search Report dated Mar. 12, 2007.
Extended EP Search Report dated Feb. 28, 2007.
EPO Search/Examination Report dated Jul. 18, 2007 in European Application No. 07103332.8.
Examination Report dated Aug. 4, 2008 in EP 06 125 077.5.
U.S. Appl. No. 11/605,456, filed Nov. 2006, Egami et al.
U.S. Appl. No. 11/606,061, filed Nov. 2006, Egami et al.
U.S. Appl. No. 11/606,060, filed Nov. 2006, Egami et al.

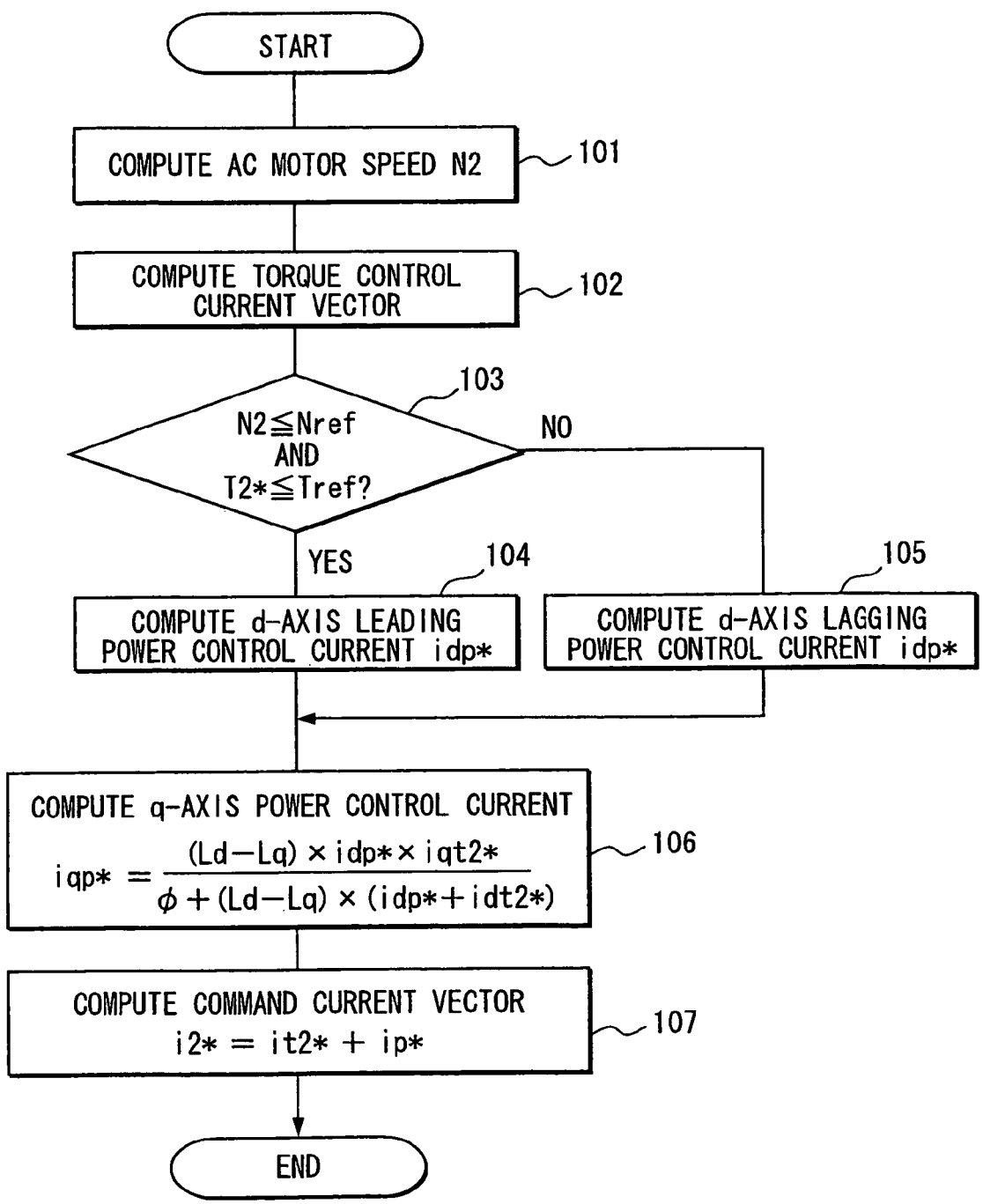

CONTROL APPARATUS FOR ELECTRIC VEHICLES

CROSS REFERENCE TO RELATED APPLICATION

This application is based on and incorporates herein by reference Japanese Patent Applications No. 2005-371264 filed on Dec. 26, 2005, No. 2006-154182 filed on Jun. 2, 2006, No. 2006-308137 filed on Nov. 14, 2006 and No. 2006-311656 filed on Nov. 17, 2006.

This application is related to five US patent applications (IPICS 99951-US, 100145-US, 100223-US 100120-US, 101862-US and 103382-US) claiming priorities to the following Japanese Patent Applications, respectively:

No. 2005-343750 filed on Nov. 29, 2005;

No. 2005-353075 filed on Dec. 7, 2005;

No. 2005-353076 filed on Dec. 7, 2005;

No. 2005-372966 filed on Dec. 26, 2005;

No. 2006-40272 filed on Feb. 17, 2006; and

No. 2006-89713 filed on Mar. 29, 2006.

FIELD OF THE INVENTION

The present invention relates to a control apparatus for an electric vehicle including a system mounted therein for converting a voltage generated by a DC power supply into a system voltage by using a voltage converter and for driving an AC motor by applying the system voltage to the AC motor through an inverter.

BACKGROUND OF THE INVENTION

As disclosed in documents such as U.S. 2006/0052915A1 (JP 2004-274945A), in an electric vehicle having AC motors mounted therein to serve as a power source of the vehicle, the AC motors are each capable of serving as a motor for driving wheels of the vehicle as well as a motor driven by the engine to generate power. As the above system, a control apparatus for the electric vehicle includes a voltage boosting converter for raising a voltage generated by a DC power supply, which is implemented by a secondary battery, to a high DC voltage appearing on a power supply line connected to AC motors through inverters. The inverters are capable of serving as a component for converting the raised DC voltage appearing on the power supply line into an AC voltage for driving one of the AC motors as well as a component for converting the AC voltage into a DC voltage supplied back or restored to the secondary battery through the voltage boosting converter, which lowers the level of the DC voltage.

In the above system, in order to stabilize the voltage appearing on the power supply line, the voltage boosting converter controls the voltage appearing on the power supply line to a target voltage. Further, at the same time, a smoothing capacitor connected to the power supply line smoothes the voltage appearing on the power supply line.

When a relation between electric power driving one of the AC motors and electric power generated by the other AC motor considerably varies due to a change in vehicle operating state or another reason, however, voltage variations caused by a change in such relation as voltage variations of the power supply line cannot be absorbed by the voltage boosting converter and/or the smoothing capacitor. Thus, the voltage appearing on the power supply line becomes excessively high. As a result, it is likely that electronic equipment connected to the power supply line is damaged. In order to cope with this problem, there is provided a method for enhancing the effect of stabilizing the voltage appearing on the power supply line by using an improved voltage boosting converter with better performance and a smoothing capacitor with a larger capacitance. By adoption of this method, however, the voltage boosting converter with better performance and the smoothing capacitor with a larger capacitance will inevitably raise the cost of the control apparatus for an electric vehicle. Thus, demands for a system having a small size and a low cost cannot be met. The above relation between the power driving one of the AC motors and the power generated by the other AC motor is also referred to as a balance of power between the power driving one of the AC motors and the power generated by the other AC motor.

It is proposed for controlling the inverter to make a sum of energies (or the balance of electric power) of the two AC motors equal to 0 at the time the connection between the DC power supply and the voltage boosting converter is cut off by using a relay in the event of a failure occurring in the DC power supply. However, this method is provided as a countermeasure to a failure occurring in the DC power supply and is capable of enhancing the effect of stabilizing the voltage appearing on the power supply line in a normal state of the power supply. In addition, even if an attempt is made to control the inverter to make a sum of energies (or the balance of power) of the two AC motors equal to 0 in a normal state, it is extremely difficult to control the inverter to make the sum of energies (or the balance of power) of the two AC motors equal to 0 in the following cases.

In the first place, one of the AC motors is linked to a driving shaft of the electric vehicle and the other AC motor is linked to an output shaft of the internal combustion engine, that is, the two AC motors are linked to members having different operations. In the second place, the effect of a processing delay of the control executed on the inverter becomes larger, for example, during a transient in which the operating state of the electric vehicle changes. The AC motor linked to the internal combustion engine is not capable of obviating power variations caused by changes of a torque generated by the internal combustion engine. This fact makes it even more difficult to control the inverter to make the sum of energies of the two AC motors equal to 0.

SUMMARY OF THE INVENTION

It is thus an object of the present invention to improve a control apparatus for electric vehicles to be capable of stabilizing a voltage appearing on a power supply line in small size and low cost.

According to one aspect of the present invention, a control apparatus comprises a power conversion unit, a system voltage control unit and a motor driving unit. The motor driving unit, as an MG unit, includes an inverter connected to a power supply line and an AC motor driven by the inverter. The power conversion unit converts a voltage generated by a DC power supply into a system voltage appearing on a power supply line. The system voltage control unit executes system voltage stabilization control of adjusting an input power different from a power required in generation of a torque in the AC motor employed in the MG unit in order to suppress variations in the system voltage. In execution of the system voltage stabilization control, a direction to adjust a current flowing to the AC motor or a direction to adjust a voltage applied to the AC motor is changed in accordance with a rotation speed detected as a rotation speed of the AC motor and/or in accordance with a torque generated in the AC motor.

In the control apparatus, the system voltage stabilization control can be executed by adjusting the input power of the MG unit in order to suppress variations in the system voltage. Thus, even if the balance of power between the AC motors varies considerably due to a change of the operating state of the electric vehicle or another cause, the system voltage appearing on the power supply line can be stabilized effectively. In addition, it is possible to enhance the effect of stabilizing the system voltage appearing on the power supply line while meeting demands for a system having a small size and a low cost without employing a voltage boosting converter with better performance and a smoothing capacitor with a larger capacitance. Specifically, since the system voltage is controlled by adjusting an input power different from a power required in generation of a torque in the AC motor, that is, by adjusting a reactive power (ineffective power), the system voltage is controlled by adjusting the input power of the AC motor while sustaining the torque generated by the AC motor at a constant value such as a command value of the torque and, hence, variations in system voltage can be suppressed without adversely affecting the operating state of the electric vehicle.

Limit values of a current flowing to the AC motor in a process to control the AC motor can be expressed by a current limit circle as shown in a d-q coordinate system of FIG. 5. A range in the current limit circle representing the limit values as well as in a voltage limit ellipse representing voltage limits is a current/voltage adjustment range in which a current vector and a voltage vector can be adjusted. The current/voltage adjustment range is characterized in that, since the higher the rotation speed of the AC motor, the smaller the area of the voltage limit ellipse, the current/voltage adjustment range in which the current vector and the voltage vector can be adjusted becomes narrower in the negative direction of the d-axis of the d-q coordinate system or a direction of a decreasing d-axis current for higher rotation speeds of the AC motor.

For this reason, when the rotation speed of the AC motor increases, causing the current/voltage adjustment range in which the current vector and the voltage vector can be adjusted to become narrower in the negative direction of the d-axis in a process to control the AC motor, if an attempt is made to control the input power of the AC motor by adjusting the current and/or voltage vectors in the leading (advancing) direction or the positive direction of the d-axis, it is possible that an input power operation quantity required for stabilizing the system voltage cannot be implemented in the current/voltage adjustment range in which the current vector and the voltage vector can be adjusted. In addition, also when the torque generated by the AC motor increases, causing the current and/or voltage vectors to become longer, if an attempt is made to control the input power of the AC motor by adjusting the current and/or voltage vectors in the leading direction or the positive direction of the d-axis, it is possible that the input power operation quantity required for stabilizing the system voltage cannot be realized in the current/voltage adjustment range in which the current vector and the voltage vector can be adjusted. Thus, the current flowing to the AC motor or the voltage applied to the AC motor needs to be adjusted in the leading or lagging direction in accordance with the torque generated by the AC motor.

In order to solve the above problem, in execution of the system voltage stabilization control, if the rotation speed of the AC motor is lower than a predetermined speed value and the torque generated by the AC motor is also smaller than a predetermined torque value, the leading direction is selected as a direction in which the current flowing to the AC motor or the voltage applied to the AC motor is adjusted. If the rotation speed of the AC motor is higher than the predetermined speed value and the torque generated by the AC motor is also greater than the predetermined torque value, the lagging direction is selected as a direction in which the current flowing to the AC motor or the voltage applied to the AC motor is adjusted.

By adjusting the current flowing to the AC motor or the voltage applied to the AC motor as above, the current or voltage vector can be adjusted in the lagging direction or the negative direction of the d-axis in order to control the input power of the AC motor when the rotation speed of the AC motor increases to a value higher than the predetermined speed value, causing the current/voltage adjustment range in which the current vector and the voltage vector can be adjusted to become narrower in the negative direction of the d-axis in a process to control the AC motor or when the torque generated by the AC motor increases to a magnitude greater than the predetermined torque value, causing the current and/or voltage vectors to become longer. Thus, the input power operation quantity required for stabilizing the system voltage can be realized in the current/voltage adjustment range in which the current vector or the voltage vector can be adjusted. As a result, the system voltage stabilization function can be implemented sufficiently.

In addition, if the input power of the AC motor is adjusted while keeping the torque generated by the AC motor at a constant value, that is, if the current or voltage vector is adjusted along a constant torque curve shown in FIG. 3, torque variations resulting from a process to adjust the current or voltage vector in the leading direction shows a tendency to decrease in comparison with torque variations resulting from a process to adjust the current or voltage vector in the lagging direction. Thus, if the current or voltage vector is adjusted in the leading direction in order to control the input power of the AC motor when the rotation speed of the AC motor decreases to a value equal to or lower than the predetermined speed value and when the torque generated by the AC motor decreases to a magnitude equal to or smaller than the predetermined torque value, it is possible to reduce torque variations in a low-speed/small-torque area existing in the characteristics of the AC motor as an area much affected by the variations in torque.

According to another aspect of the present invention, which may be alternative or additional to the one aspect, the system voltage control unit sets, during execution of the system voltage stabilization control, at least one of a current flowing to the AC motor and a voltage applied to the AC motor to a strong magnetic field side, when a torque generated by the AC motor is substantially zero.

BRIEF DESCRIPTION OF THE DRAWINGS

The above and other objects, features and advantages of the present invention will become more apparent from the following detailed description made with reference to the accompanying drawings. In the drawings:

FIG. 4 is a flowchart showing processing of a program to be executed to compute the command current vector;

DETAILED DESCRIPTION OF THE PREFERRED EMBODIMENT

First Embodiment

Figure 1:
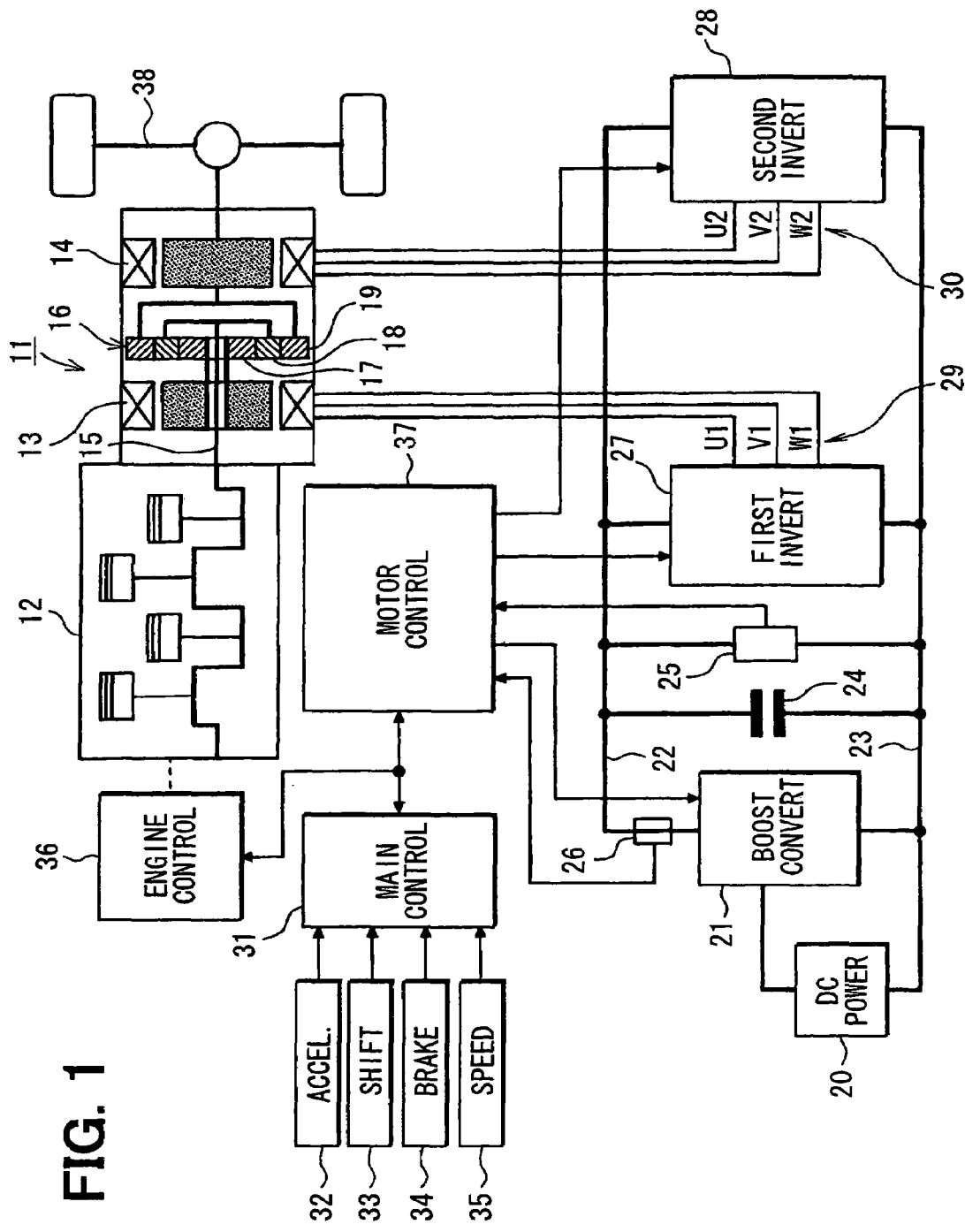
FIG. 1 is a schematic diagram showing a driving system for an electric vehicle in accordance with a first embodiment of the present invention.

Referring first to FIG. 1, an electric vehicle 11 has an internal combustion engine 12 in addition to a first AC motor 13 and a second AC motor 14. Thus, the electric vehicle 11 is an engine/motor hybrid vehicle. The engine 12 and the second AC motor 14 are employed as a drive power source for driving the electric vehicle 11. Power generated by a crankshaft 15 of the engine 12 is divided into two paths by a planetary gear set 16. The planetary gear set 16 includes a sun gear 17, a planetary gear 18 and a ring gear 19. The sun gear 17 rotates at the center. The planetary gear 18 rotates along a circumference external to the sun gear 17 while revolving around the center of its own. The ring gear 19 rotates along a circumference external to the planetary gear 18. The planetary gear 18 is linked to the crankshaft 15 of the engine 12 through a carrier not shown in the figure. On the other hand, the ring gear 19 is linked to a rotation shaft of the second AC motor 14. The sun gear 17 is linked to the first AC motor 13.

A secondary battery serving as a DC power supply 20 is connected to a voltage boosting converter 21 serving as a power conversion means. The voltage boosting converter 21 is a component having a function for increasing a DC voltage output by the DC power supply 20 in order to generate a DC system voltage supplied between a power supply line 22 and a ground line 23 as well as a function for decreasing the system voltage in order to return or restore power to the DC power supply 20. A smoothing capacitor 24 for smoothing the system voltage and a voltage sensor 25 serving as a voltage detection means for detecting a value of the system voltage are connected between the power supply line 22 and the ground line 23. A current sensor 26 serving as a current detection means is placed on the power supply line 22 as a means for detecting a current flowing through the power supply line 22.

In addition, a three-phase first inverter 27 and a three-phase second inverter 28 are also connected between the power supply line 22 and the ground line 23. The three-phase first inverter 27 and the three-phase second inverter 28 are each a three-phase inverter of a voltage control type. The three-phase first inverter 27 drives the first AC motor 13, whereas the three-phase second inverter 28 drives the second AC motor 14. The three-phase first inverter 27 and the first AC motor 13 form a first motor driving unit 29, which is also referred to as a first MG unit 29. Similarly, the three-phase second inverter 28 and the second AC motor 14 form a second motor driving unit 30, which is also referred to as a second MG unit 30.

A main control unit 31 is a computer for executing overall control on the electric vehicle as a whole. The main control unit 31 acquires signals output by a variety of sensors and switches in order to detect an operating state of the electric vehicle. The sensors and the switches include an accelerator sensor 32, a shift switch 33, a brake switch 34 and a vehicle speed sensor 35. The accelerator sensor 32 is a sensor for detecting an acceleration operation quantity representing an operation quantity of an acceleration pedal. The shift switch 33 is a sensor for detecting the position of a shift operation of the electric vehicle. The position of the shift operation can be a parking position (P), a rear driving position (R), a neutral position (N) or a forward driving position (D). The brake switch 34 is a switch for detecting a braking operation. The vehicle speed sensor 35 is a sensor for detecting a value of the speed of the electric vehicle. The main control unit 31 exchanges control and data signals with an engine control unit 36 and a motor control unit 37, driving the engine control unit 36 and the motor control unit 37 in order to control the engine 12, the first AC motor 13 and the second AC motor 14 in accordance with the operating state of the electric vehicle. The engine control unit 36 is for controlling the operation of the engine 12, whereas the motor control unit 37 is for controlling the operations of the first AC motor 13 and the second AC motor 14.

Figure 2:
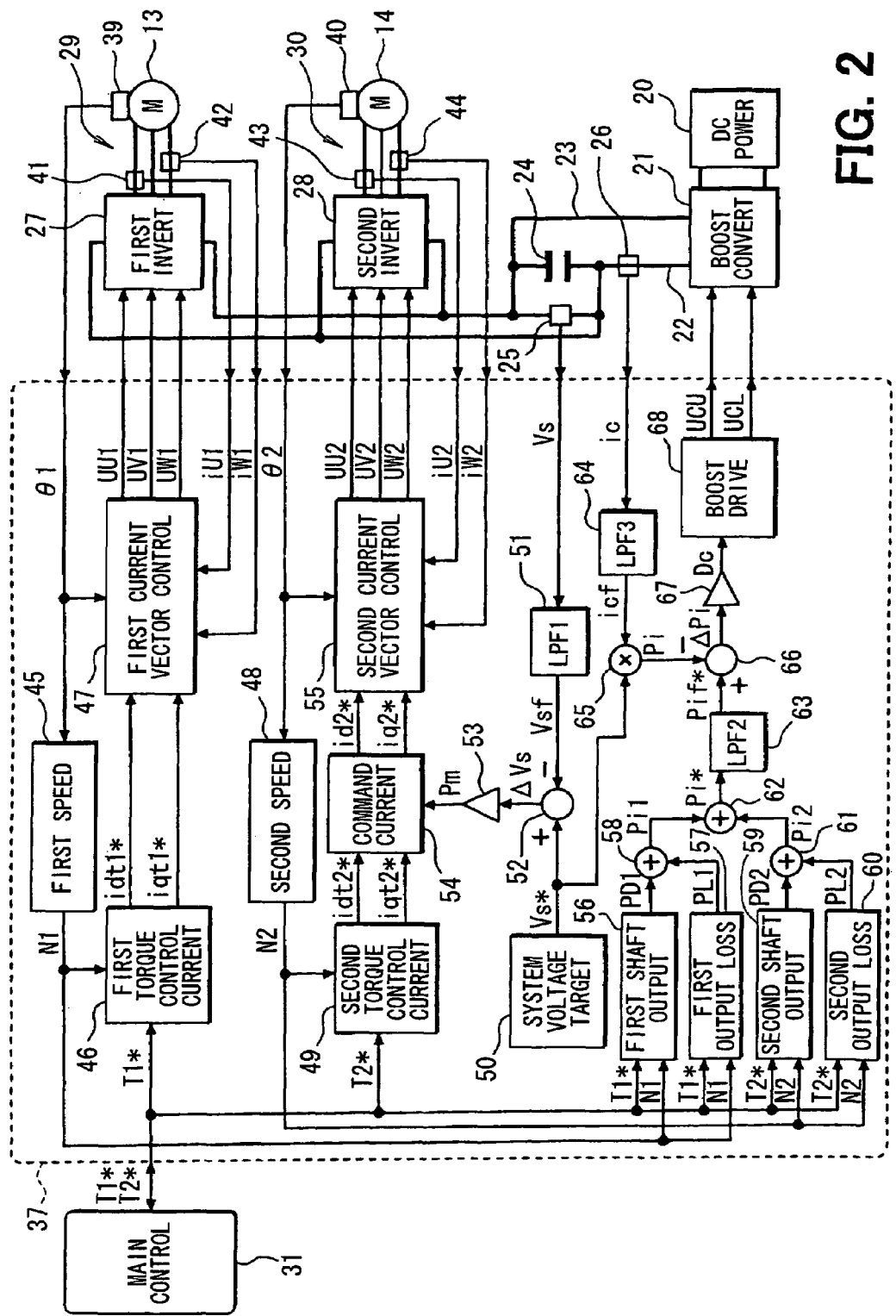
FIG. 2 is a block diagram showing a control system employed in the driving system for controlling AC motors in the driving system.

Next, control of the first AC motor 13 and the second AC motor 14 is described by referring to FIG. 2. The first AC motor 13 and the second AC motor 14 are each a three-phase permanent-magnet synchronous motor having an interior permanent magnet. The first AC motor 13 and the second AC motor 14 have respectively rotor rotational position sensors 39 and 40 each used for detecting the rotational position of the rotor of the motor. On the basis of three-phase voltage command signals UU1, UV1 and UW1 output by the motor control unit 37, the first inverter 27 of the voltage control type converts a DC voltage appearing on the power supply line 22 into three-phase AC voltages U1, V1 and W1 for driving the first AC motor 13. The DC voltage appearing on the power supply line 22 is a system voltage supplied by the voltage boosting converter 21. A U-phase current sensor 41 is a sensor for detecting a U-phase current iU1 of the first AC motor 13, whereas a W-phase current sensor 42 is a sensor for detecting a W-phase current iW1 of the first AC motor 13.

Similarly, on the basis of three-phase voltage command signals UU2, UV2 and UW2 output by the motor control unit 37, the three-phase second inverter 28 of the voltage control type converts the DC voltage appearing on the power supply line 22 into three-phase AC voltages U2, V2 and W2 for driving the second AC motor 14. A U-phase current sensor 43 is a sensor for detecting a U-phase current iU2 of the second AC motor 14, whereas a W-phase current sensor 44 is a sensor for detecting a W-phase current iW2 of the second AC motor 14.

It is to be noted that the first AC motor 13 and the second AC motor 14 each also function as a generator, when the first AC motor 13 and the second AC motor 14 are driven by the three-phase first inverter 27 and the three-phase second inverter 28 respectively to generate a negative torque. For example, when the electric vehicle 11 is being decelerated, AC power generated by the second AC motor 14 as a deceleration energy is converted into DC power by the three-phase second inverter 28 and the DC power is accumulated back in the DC power supply 20. Normally, a portion of power of the engine 12 is transferred to the first AC motor 13 by way of the planetary gear 18, causing the first AC motor 13 to operate as a generator for generating electric power corresponding to the portion of the power of the engine 12. The electric power generated by the first AC motor 13 is supplied to the second AC motor 14, causing the second AC motor 14 to operate as a motor. The power of the engine 12 is divided into two paths by the planetary gear set 16. When a torque transmitted to the ring gear 19 of the planetary gear set 16 is greater than a torque required by a traveling operation of the electric vehicle, the first AC motor 13 functions as a motor, drawing power for the engine 12. In this case, the second AC motor 14 functions as a generator generating power to be supplied to the first AC motor 13. Thus, each of the first AC motor 13 and the second AC motor 14 operates as a motor/generator (MG).

In execution of torque control on the first AC motor 13, the motor control unit 37 generates the three-phase voltage command signals UU1, UV1 and UW1 by a sinusoidal waveform PWM control method on the basis of a torque command value T1* output by the main control unit 31, the U-phase current iU1 and W-phase current iW1 of the first AC motor 13 as well as the rotor rotational position $\theta 1$ of the first AC motor 13 as described below. As described above, the U-phase current iU1 and the W-phase current iW1 are signals output by the current sensors 41 and 42 respectively, whereas the rotor rotational position $\theta 1$ is a signal output by a rotor rotational position sensor 39.

The signal output by the rotor rotational position sensor 39 as a signal representing the rotor rotational position $\theta 1$ of the first AC motor 13 is supplied to a first rotation speed computation unit 45 for computing a first rotation speed N1 of the first AC motor 13. Then, in order to apply current feedback control to each of a d-axis current id1 and a q-axis current iq1 independently of each other in a d-q coordinate system set as a rotational coordinate system of the rotor of the first AC motor 13, a first torque control current computation unit 46 computes a torque control current vector it1* representing a d-axis torque control current idt1* and a q-axis torque control current iqt1* by using typically map data or an equation as a vector according to the torque command value T1* and rotation speed N1 of the first AC motor 13.

Subsequently, a first current vector control unit 47 computes an actual current vector i1 representing the d-axis current id1 and the q-axis current iq1 on the basis of the U-phase current iU1 and W-phase current iW1 of the first AC motor 13 as well as the rotor rotational position $\theta 1$ of the first AC motor 13 as described below. As described above, the U-phase current iU1 and the W-phase current iW1 are signals output by the current sensors 41 and 42 respectively, whereas the rotor rotational position $\theta 1$ is a signal output by the rotor rotational position sensor 39. Then, the first current vector control unit 47 computes a d-axis command voltage Vd1* by execution of P-I control for reducing a difference $\Delta id1$ between a d-axis torque control current idt1* and an actual d-axis current id1, and computes a q-axis command voltage Vq1* by execution of proportional-and-integral (P-I) control for reducing a difference $\Delta iq1$ between a q-axis torque control current iqt1* and an actual q-axis current iq1. Finally, the first current vector control unit 47 converts the d-axis command voltage Vd1* and the q-axis command voltage Vq1* into the three-phase PWM command signals UU1, UV1 and UW1, outputting the three-phase PWM command signals UU1, UV1 and UW1 to the three-phase first inverter 27.

In execution of torque control on the second AC motor 14, on the other hand, the motor control unit 37 generates the three-phase voltage command signals UU2, UV2 and UW2 by the sinusoidal-waveform PWM control method on the basis of a torque command value T2* output by the main control unit 31, the U-phase current iU2 and W-phase current iW2 of the second AC motor 14 as well as the rotor rotational position $\theta 2$ of the second AC motor 14. As described below, the U-phase current iU1 and the W-phase current iW1 are signals output by the current sensors 43 and 44 respectively, whereas the rotor rotational position $\theta 1$ is a signal output by the rotor rotational position sensor 40.

At that time, control of stabilizing the system voltage is executed in order to suppress variations in system voltage while sustaining the torque generated by the second AC motor 14 at a constant value (that is, a torque command value T2*) by adjusting an input power of the second AC motor 14 through adjustment of a current vector so as to change only the input power (or reactive power) different from the power required for generation of the torque of the second AC motor 14.

In the system voltage stabilization control, if the rotation speed N2 of the second AC motor 14 is higher than a predetermined value Nref or a torque command value T2* is greater than a predetermined value Tref, the current vector is adjusted in the lagging direction or the negative direction of the d-axis in order to control the input power of the second AC motor 14 so as to implement an input power operation quantity Pm required in stabilization of the system voltage. If the rotation speed N2 of the second AC motor 14 is not higher than the predetermined value Nref and the torque command value T2* (or information on a generated torque) is not greater than the predetermined value Tref, on the other hand, the current vector is adjusted in the leading direction or the positive direction of the d-axis in order to control the input power of the second AC motor 14 so as to reduce variations in torque.

Specifically, first of all, the signal output by the rotor rotational position sensor 40 as a signal representing the rotor rotational position $\theta 2$ of the second AC motor 14 is supplied to a second rotation speed computation unit 48 for computing a rotation speed N2 of the second AC motor 14. Then, in order to apply current feedback control to each of a d-axis current id2 and a q-axis current iq2 independently of each other in a d-q coordinate system set as a rotational coordinate system of the rotor of the second AC motor 14, a second torque control current computation unit 49 computes a torque control current vector it2* representing a d-axis torque control current idt2* and a q-axis torque control current iqt2* by using typically map data or an equation as a vector according to the torque command value T2* and rotation speed N2 of the second AC motor 14.

Then, a system voltage target value computation unit 50 serving as a target value computation means computes a target value Vs* of the system voltage, whereas the voltage sensor 25 supplies a detected value Vs of the system voltage to a low pass filter 51 serving as a first low frequency component passing means for carrying out a low pass filtering process to pass only components included in the detected value Vs of the system voltage as components each having a low frequency. Subsequently, a subtractor 52 computes a difference $\Delta Vs$ between the target value Vs* of the system voltage and a detected value Vsf output by the low pass filtering process as the detected value of the system voltage, supplying the difference $\Delta Vs$ to the a P-I controller 53 serving as a power operation quantity computation means for computing an input power operation quantity Pm of the second AC motor 14 as a quantity that reduces the difference $\Delta Vs$ between the target value Vs* of the system voltage and the detected value Vsf output by the low pass filtering process as the detected value of the system voltage by execution of P-I control.

Figure 3:
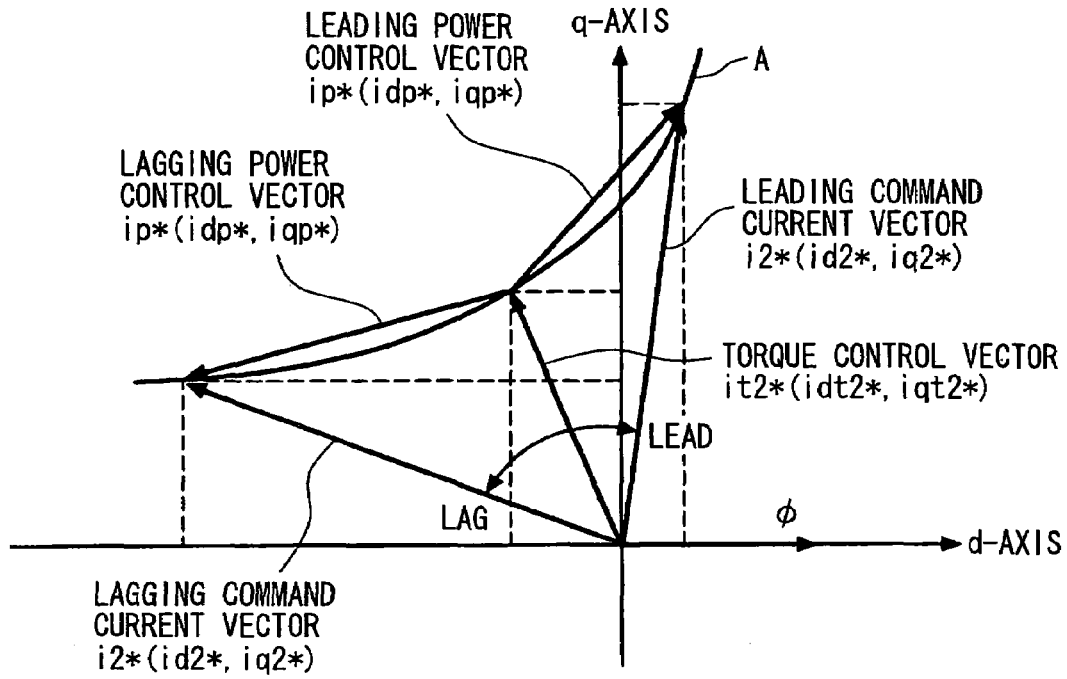
FIG. 3 is a characteristic diagram showing a method of computing a command current vector in the control system.

Then, the input power operation quantity Pm and a torque control current vector it2* representing a d-axis torque control current vector idt2* and a q-axis torque control current vector iqt2* are supplied to a command current computation unit 54 serving as a system voltage control means in order to compute a power control current vector ip* that changes, by the input power operation quantity Pm, a reactive power contributing none to generation of a torque in the second AC motor 14 as shown in FIG. 3. The power control current vector ip* represents a d-axis power control current vector idp* and a q-axis torque control current vector iqp*.

At that time, if the rotation speed N2 of the second AC motor 14 is not higher than the predetermined value Nref and the torque command value T2* is not greater than the predetermined value Tref, the command current computation unit 54 computes a leading-side power control current vector ip*, which is a power control current vector ip* oriented in the positive direction of the d-axis. If the rotation speed N2 of a second AC motor 14 is higher than the predetermined value Nref or the torque command value T2* is greater than the predetermined value Tref, on the other hand, the command current computation unit 54 computes a lagging-side power control current vector ip*, which is a power control current vector ip* oriented in the negative direction of the d-axis.

Then, the torque control current vector it2* representing a d-axis torque control current vector idt2* and a q-axis torque control current vector iqt2* are synthesized with the leading-side or lagging-side power control current vector ip* representing the d-axis power control current vector idp* and the q-axis power control current vector iqp* to result in a leading-side or lagging-side command current vector i2* representing the d-axis command current vector id2* and the q-axis command current vector iq2* as expressed by the following equation:

$$i2*(id2*,iq2*)=it2*(idt2*,iqt2*)+ip*(idp*,iqp*)$$

The command current vector i2* is computed by execution of a command current vector computation program represented as a flowchart shown in FIG. 4. The flowchart representing the command current vector computation program begins with step 101 at which the rotation speed N2 of the second AC motor 14 is computed on the basis of the signal output by the rotor rotational position sensor 40 as the signal representing the rotor rotational position θ2 of the second AC motor 14. Then, at next step 102, the torque control current vector it2* representing the d-axis torque control current vector idt2* and the q-axis torque control current vector iqt2* is computed on the basis of the torque command value T2* of the torque generated by the second AC motor 14 and the rotation speed N2 by using typically map data or in accordance with a mathematical equation.

Then, at next step 103, the rotation speed N2 of the second AC motor 14 is compared with the predetermined value Nref in order to produce a result of determination as to whether or not the rotation speed N2 of the second AC motor 14 is equal to or lower than the predetermined value Nref. Similarly, the torque command value T2* of the torque generated by the second AC motor 14 is compared with the predetermined value Tref in order to produce a result of determination as to whether or not the torque command value T2* of the torque generated by the second AC motor 14 is equal to or smaller than the predetermined value Tref.

If the results of the determinations indicate that the rotation speed N2 of the second AC motor 14 is equal to or lower than the predetermined value Nref and the torque command value T2* of the torque generated by the second AC motor 14 is equal to or smaller than the predetermined value Tref, the processing proceeds to step 104 to compute a leading-side d-axis power control current vector idp* for the input power operation quantity Pm and the torque control current vector it2* (representing the d-axis torque control current vector idt2* and the q-axis torque control current vector iqt2*) by referring to map data of the leading-side d-axis power control current vector idp*. The map data of the leading-side d-axis power control current vector idp* is map data setting the leading-side d-axis power control current vector idp* in such a way that the power control current vector ip* changing the reactive power of the second AC motor 14 by the input power operation quantity Pm becomes the power control current vector ip* oriented in the positive direction of the d-axis.

If the determination results produced at the step 103 indicate that the rotation speed N2 of the second AC motor 14 is higher than the predetermined value Nref or the torque command value T2* of the torque generated by the second AC motor 14 is greater than the predetermined value Tref, on the other hand, the processing of the program proceeds to step 105 to compute the lagging-side d-axis power control current vector idp* for an input power operation quantity Pm and the torque control current vector it2* (representing the d-axis torque control current vector idt2* and the q-axis torque control current vector iqt2*) by referring to map data of the lagging-side d-axis power control current vector idp*. The map data of the lagging-side d-axis power control current vector idp* is map data setting the lagging-side d-axis power control current vector idp* in such a way that the power control current vector ip* changing the reactive power of the second AC motor 14 by the input power operation quantity Pm becomes the power control current vector ip* oriented in the negative direction of the d-axis.

Then, at the next step 106, the leading-side or lagging-side d-axis power control current vector idp* is used in the following equation to compute the leading-side or lagging-side q-axis power control current vector iqp*:

$$iqp*=(Ld-Lq)\times idp*\times iqpt2*/\{\phi+(Ld-Lq)\times(idp*+idt2*)\}$$

where notations φ, Ld and Lq denote respectively a flux linkage, a d-axis inductance and a q-axis inductance, which are machine constants of the second AC motor 14.

As described above, the processes of the steps 104 to 106 are carried out to compute the leading-side or lagging-side power control current vector ip* representing the d-axis power control current vector idp* and the q-axis power control current vector iqp*, which change the reactive power of the second AC motor 14 by the input power operation quantity Pm while sustaining the torque generated by the second AC motor 14 at a constant magnitude, that is, the torque command value T2*.

Then, at next step 107, the torque control current vector it2* representing the d-axis torque control current vector idt2* and the q-axis torque control current vector iqt2* is synthesized with the leading-side or lagging-side power control current vector ip* representing the d-axis power control current vector idp* and the q-axis power control current vector iqp* to result in the leading-side or lagging-side command current vector i2* representing the d-axis command current vector id2* and the q-axis command current vector iq2* as expressed by the following equation:

$$i2*(id2*,iq2*)=it2*(idt2*,iqt2*)+ip*(idp*,iqp*)$$

In this way, if the rotation speed N2 of the second AC motor 14 is equal to or lower than the predetermined value Nref and the torque command value T2* of the torque generated by the second AC motor 14 is equal to or smaller than the predetermined value Tref, the command current vector i2* on the leading side with respect to the torque control current vector it2* is set in order to adjust the current vector to a value on the leading side in an operation to control the input power of the second AC motor 14. If the rotation speed N2 of the second AC motor 14 is higher than the predetermined value Nref or the torque command value T2* of the torque generated by the second AC motor 14 is greater than the predetermined value Tref, on the other hand, the command current vector i2* on the lagging side with respect to the torque control current vector it2* is set in order to adjust the current vector to the value on the lagging side in an operation to control the input power of the second AC motor 14.

After the final command current vector i2* is computed as above, as shown in FIG. 2, the second current vector control unit 55 computes an actual current vector i2 representing the d-axis current id2 and the q-axis current iq2 on the basis of signals output by the current sensors 43 and 44 as signals representing respectively the U-phase current iU2 and W-phase current iW2 of the second AC motor 14 as well as a signal output by the rotor rotational position sensor 40 as a signal representing the rotor rotational position θ2 of the second AC motor 14. Then, the second current vector control unit 55 computes the d-axis command voltage Vd2* by execution of P-I control for reducing a difference Δid2 between the d-axis command current id2* and the actual d-axis current id2, and computes the q-axis command voltage Vq2* by execution of P-I control for reducing a difference Δiq2 between the q-axis command current iq2* and the actual q-axis current iq2. Finally, the second current vector control unit 55 converts the d-axis command voltage Vd2* and the q-axis command voltage Vq2* into the three-phase PWM command signals UU2, UV2 and UW2, outputting the three-phase PWM command signals UU2, UV2 and UW2 to the three-phase second inverter 28.

As described above, the control of stabilizing the system voltage is executed by adjusting the input power of the second MG unit 30 (or the second AC motor 14) in order to decrease the difference ΔVs between the target value Vs* of the system voltage and the detected value Vsf output by the low pass filtering process as the detected value of the system voltage while sustaining the torque generated by the second AC motor 14 at a constant value (that is, a torque command value T2*).

In addition, in order to obviate mutual interferences between the system voltage stabilization control to stabilize the system voltage by adjusting the input power of the second MG unit 30 as described above and the control executed by the voltage boosting converter 21 to adjust the system voltage, the motor control unit 37 executes conversion power control of controlling a conduction duty ratio Dc of a switching device (not shown) as a device employed in the voltage boosting converter 21 so as to reduce the difference ΔPi between the command value Pi* of a power, which is output by the voltage boosting converter 21 as a power referred to hereafter as a conversion power, and the detected value Pi of the conversion power.

Specifically, in order to compute the command value Pi* of the conversion power, first of all, the torque command value T1* and rotation speed N1 of the first AC motor 13 are supplied to a first output computation unit 56 to be used for computing an output PD1 of the first AC motor 13. At the same time, the torque command value T1* and rotation speed N1 of the first AC motor 13 are supplied to a first output loss computation unit 57 to be used for computing an output loss PL1 of the first MG unit 29. Then, an adder 58 adds the output PD1 of the first AC motor 13 to the output loss PL1 of the first MG unit 29 in order to compute an input power Pi1 of the first MG unit 29. At that time, if the first AC motor 13 is functioning as a generator, the computation result of the input power Pi1 of the MG unit 29 is a negative value.

In the mean time, a torque command value T2* and rotation speed N2 of the second AC motor 14 are supplied to a second output computation unit 59 to be used for computing a output PD2 of the second AC motor 14. At the same time, the torque command value T2* and rotation speed N2 of the second AC motor 14 are supplied to a second output loss computation unit 60 to be used for computing an output loss PL2 of the second MG unit 30. Then, an adder 61 adds the output PD2 of the second AC motor 14 to the output loss PL2 of the second MG unit 30 in order to compute an input power Pi2 of the second MG unit 30. At that time, if the second AC motor 14 is functioning as a motor, the computation result of the input power Pi2 of the second MG unit 30 is a positive value.

Then, an adder 62 adds the input power Pi1 of the first MG unit 29 to the input power Pi2 of the second MG unit 30 to compute a total power Pi*. This total power Pi* is supplied to a second low pass filter 63 serving as a second low frequency component passing means for carrying out a low pass filtering process to pass only components included in the total power Pi* as components each having a low frequency. A total power Pif* obtained by the low pass filtering process is taken as a command value Pif* of the conversion power. The adder 62 and the second low pass filter 63 operate as a conversion power command value computation means.

In order to compute the detected value Pi of the conversion power, on the other hand, a signal output by the current sensor 26 as a signal representing a detected value ic of the output current of the voltage boosting converter 21 is supplied to a third low pass filter 64 serving as a third low frequency component passing means for carrying out a low pass filtering process to pass only components included in the output current of the voltage boosting converter 21 as components each having a low frequency. The third low pass filter 64 supplies a detected value icf of the output current of the voltage boosting converter 21 as a result obtained from the low pass filtering process to a conversion power detection unit 65 serving as a conversion value computation means. The conversion power detection unit 65 multiplies the detected value icf by the target value Vs* of the system voltage in order to compute a detected value Pi of the conversion power. It is to be noted that a detected value Pi of the conversion power can also be computed by multiplying the detected value icf of the output current of the voltage boosting converter 21 by the detected value Vsf of the system voltage.

Then, a subtractor 66 computes a difference ΔPi between a command value Pif* and detected value Pi of the conversion power. The subtractor 66 supplies the difference ΔPi to a P-I controller 67 serving as a conversion power control quantity computation means for computing the conduction duty ratio Dc of a switching device (not shown) by execution of P-I control to reduce the difference ΔPi between the command value Pif* and detected value Pi of the conversion power. The conduction duty ratio Dc is supplied to a voltage boosting drive signal computation unit 68 serving as a conversion power control means. Subsequently, the voltage boosting drive signal computation unit 68 computes voltage boosting drive signals UCU and UCL on the basis of the conduction duty ratio Dc and supplies the voltage boosting drive signals UCU and UCL to the voltage boosting converter 21.

As described above, the conversion power control of adjusting the conversion power of the voltage boosting converter 21 is executed in order to reduce the difference ΔPi between the command value Pif* and detected value Pi of the conversion power and, at the same time, obviate mutual interferences between the system voltage stabilization control to stabilize the system voltage by adjusting the input power of the second MG unit 30 and the control executed by the voltage boosting converter 21 to adjust the system voltage.

In the embodiment described above, the system voltage stabilization control of controlling the system voltage appearing on the power supply line 22 is executed by adjusting the input power of the second MG unit 30 (or the second AC motor 14) so as to decrease the difference ΔVs between the target value Vs* and detected value Vsf of the system voltage. Thus, even if the balance of power between the AC motors 13 and 14 varies considerably due to a change of the operating state of the vehicle or another cause, the system voltage appearing on the power supply line 22 can be stabilized effectively. In addition, it is possible to enhance the effect of stabilizing the system voltage appearing on the power supply line 22 while meeting demands for a system having a small size and a low cost without employing a voltage boosting converter 21 with better performance and a smoothing capacitor 24 with a larger capacitance.

Figure 5:
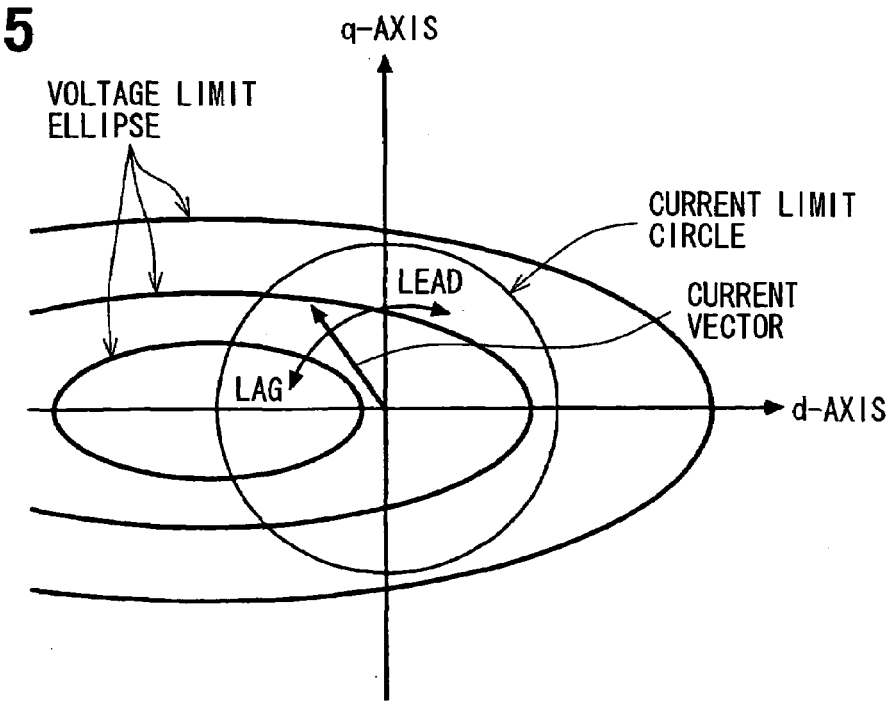
FIG. 5 is a characteristic diagram showing a range in which the current vector can be adjusted.

Here, limit values of a current flowing to the first AC motor 13 or the second AC motor 14 in a process to control the AC motor can be expressed by a current limit circle as shown in the d-q coordinate system of FIG. 5. A range in the current limit circle representing the limit values as well as in a voltage limit ellipse representing voltage limits is a current/voltage adjustment range in which the current vector and the voltage vector can be adjusted. The current/voltage adjustment range is characterized in that, since the higher the rotation speed of the first AC motor 13 or the second AC motor 14, the smaller the area of the voltage limit ellipse, the current/voltage adjustment range in which the current vector and the voltage vector can be adjusted becomes narrower in the negative direction of the d-axis of the d-q coordinate system or a direction of a decreasing d-axis current for higher rotation speeds of the first AC motor 13 or the second AC motor 14.

For the above reason, when the rotation speed N2 of the second AC motor 14 increases, causing the current/voltage adjustment range in which the current vector and the voltage vector can be adjusted to become narrower in the negative direction of the d-axis in the system voltage stabilization control, if an attempt is made to control the input power of the second AC motor 14 by adjusting the current vector in the leading direction or the positive direction of the d-axis, it is possible that the input power operation quantity Pm required for stabilizing the system voltage cannot be implemented in the current/voltage adjustment range in which the current vector and the voltage vector can be adjusted. In addition, also when the command value T2* of the torque generated by the second AC motor 14 increases, causing the current vector (that is, the torque control vector it2*) to become longer, if an attempt is made to control the input power of the second AC motor 14 by adjusting the current vector in the leading direction or the positive direction of the d-axis, it is possible that the input power operation quantity Pm required for stabilizing the system voltage cannot be realized in the current/voltage adjustment range in which the current vector and the voltage vector can be adjusted.

In order to solve the problem described above, in execution of the system voltage stabilization control according to the embodiment, if the rotation speed N2 of the second AC motor 14 is higher than the predetermined speed value Nref or the command value T2* of the torque generated by the second AC motor 14 is greater than the predetermined torque value Tref, the torque control current vector it2* is synthesized with the lagging-side power control current vector ip* in order to set a command current vector i2* on the lagging side with respect to the torque control current vector it2*. In this way, the current vector is adjusted to a value on the lagging side in order to control the input power of the second AC motor 14. Thus, when the rotation speed N2 of the second AC motor 14 increases to a value greater than the predetermined value Nref, causing the current/voltage adjustment range in which a current vector and a voltage vector can be adjusted to become narrower in the negative direction of the d-axis or when the command value T2* of the torque generated by the second AC motor 14 increases to a magnitude greater than the predetermined value Tref, causing the current vector (that is, the torque control vector it2*) to become longer, the current vector is adjusted to a value on the lagging side in order to control the input power of the second AC motor 14. As a result, the input power operation quantity Pm required for stabilizing the system voltage can be realized in the current/voltage adjustment range, in which the current vector and the voltage vector can be adjusted, so that the system voltage stabilization function can be implemented sufficiently.

If the rotation speed N2 of the second AC motor 14 is equal to or lower than the predetermined speed value Nref and the command value T2* of the torque generated by the second AC motor 14 is equal to or smaller than the predetermined torque value Tref, on the other hand, the torque control current vector it2* is synthesized with the leading-side power control current vector ip* in order to set a command current vector i2* on the leading side with respect to the torque control current vector it2*. In this way, the current vector is adjusted to a value on the leading side in order to control the input power of the second AC motor 14. If the input power of the second AC motor 14 is adjusted while keeping the torque generated by the second AC motor 14 at a constant value, that is, if the current or voltage vector is adjusted along a constant torque curve shown in FIG. 3, torque variations resulting from a process to adjust the current or voltage vector in the leading direction shows a tendency to decrease in comparison with torque variations resulting from a process to adjust the current or voltage vector in the lagging direction. Thus, if the current or voltage vector is adjusted in the leading direction in order to control the input power of the second AC motor 14 when the rotation speed N2 of the second AC motor 14 increases to a value equal to or lower than the predetermined value Nref, and when the command value T2* of the torque generated by the second AC motor 14 increases to a magnitude equal to or smaller than the predetermined value Tref, it is possible to reduce torque variations in a low-speed/small-torque area existing in the characteristics of the second AC motor 14 as an area much affected by the variations in torque.

Second Embodiment

The first embodiment may be modified in that, the positive d-axis current is supplied by setting the current vector to a stronger magnetic field side, when the torque command value T2* of the second AC motor 14 is substantially zero (within a predetermined range including zero), that is, when the reactive power is operated by controlling the current vector on the d-axis). This is for restricting the permanent magnet of the AC motor 14 from being demagnetized irreversibly, so that the characteristics of the AC motor 14 may be maintained without being changed.

Figure 7:
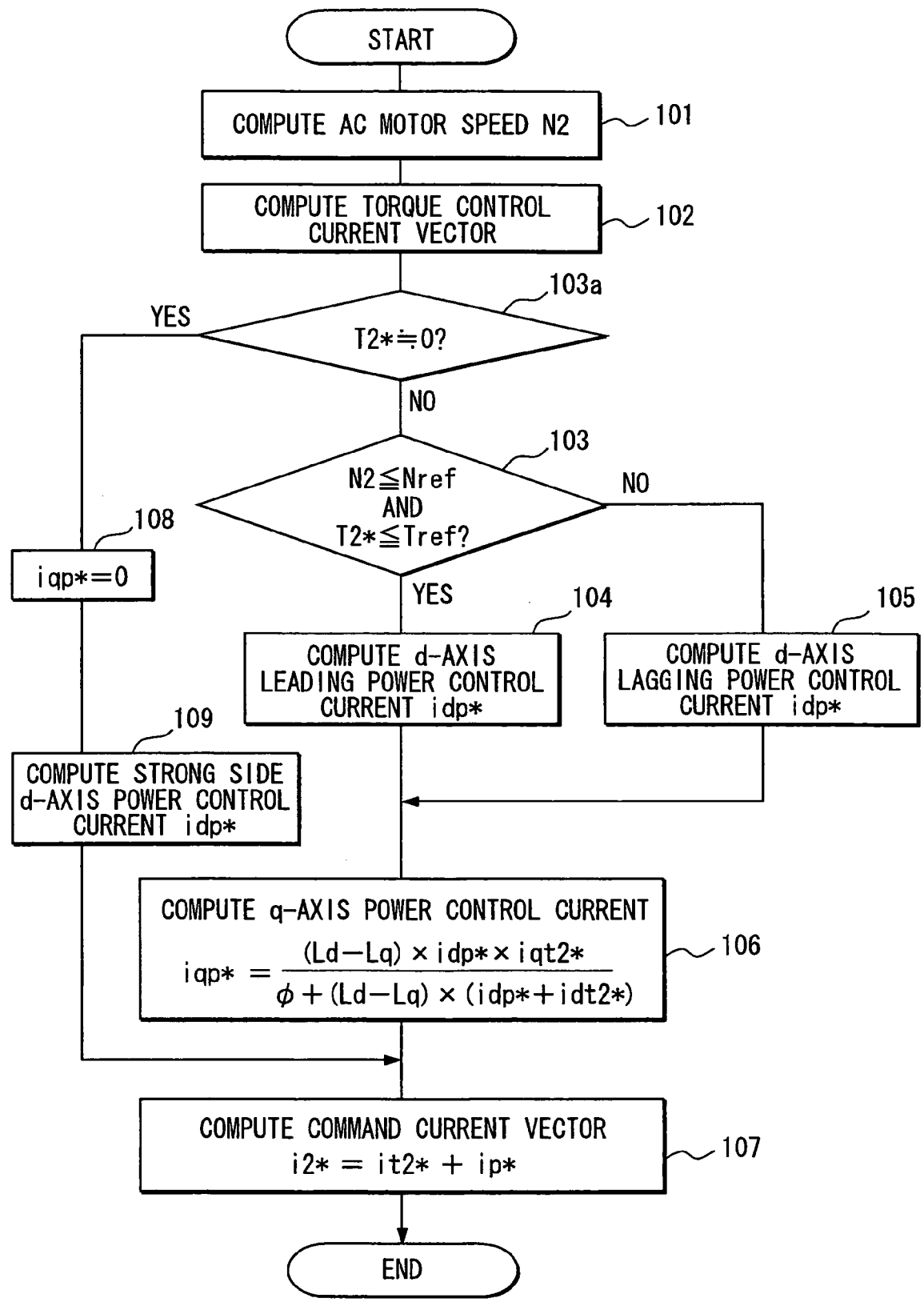
FIG. 7 is a flowchart showing processing of a program to be executed to compute the command current vector in the second embodiment.

Thus, the processing (FIG. 4) in the first embodiment is modified as shown in FIG. 7 by adding steps 103a, 108 and 109. More specifically, at step 103 following step 102, it is checked whether the torque command value T2* is nearly or substantially zero. If the torque command value T2* is not nearly zero, steps 103 to 107 are executed in that same manner as in the first embodiment.

If the torque command value T2* is nearly zero, on the other hand, the q-axis power control current iqp* is set to 0 at step 108. Then at step 109, the by referring to a data map provided for the d-axis power control current idp* of the strong magnetic field side, the d-axis power control current idp* of the strong magnetic field side is computed on the basis of the input power operation quantity Pm. This data map of the strong magnetic field side sets the current idp* of the strong magnetic field side to a positive value, so that the power control current vector ip* for changing the reactive power of the second AC motor 14 by a quantity of the input power operation quantity Pm may become the power current vector ip* directed to the positive direction on the d-axis. This power current vector ip* in the strong magnetic field side is shown by a solid line arrow in FIG. 6, while the power current vector ip* in the weak magnetic field side is shown by a dotted line arrow.

Then, at step 107, the command current vector i2* is computed by combining the torque current vector it2* and the power control current vector ip*. If the torque command value T2* is nearly zero, the torque control current vector it2* (idt2*, iqt2*) is nearly zero. Therefore, the power control current vector ip* (idp*, 0) is directly used as the command current vector i2* (id2*, iq2*) as shown in the following expression, so that the command current vector i2* is set to the strong magnetic field side and the positive d-axis current is supplied.

$$i2^*(id2^*, iq2^*) = ip^*(idp^*, 0)$$

Figure 6:
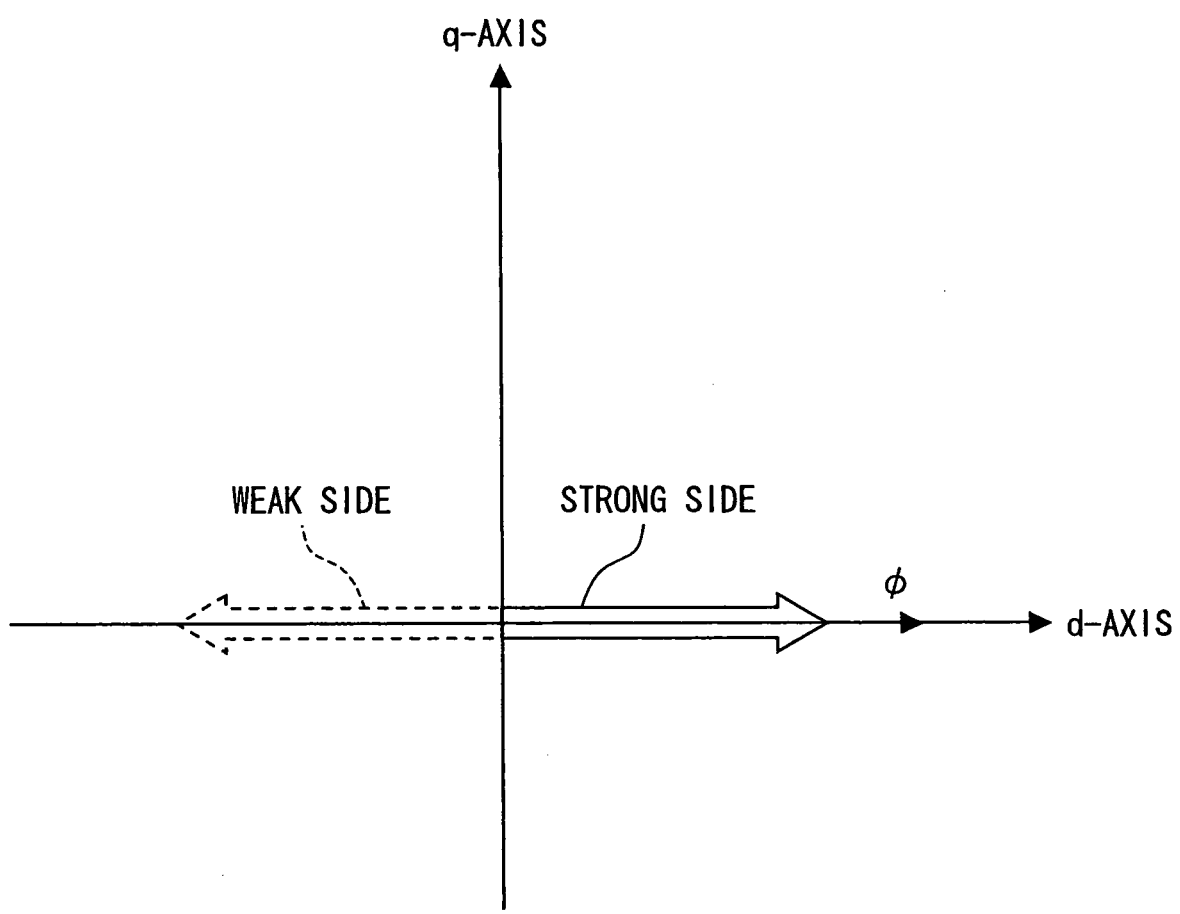
FIG. 6 is a characteristic diagram showing a method of setting the command current vector in the case that a torque of an AC motor is substantially zero in accordance with a second of the present invention.

It will be noted in the second embodiment that, when the system voltage stabilization control is performed, the reactive power is operated by controlling the current vector on the d-axis when the torque generated by the second AC motor 14 is nearly zero. If the current vector is set at the weak magnetic filed side and a negative d-axis current is supplied as shown in FIG. 6, it is likely that the permanent magnet in the second AC motor 14 is demagnetized irreversibly. This will occur because the d-axis armature reaction acts in the opposite polarity to reduce the magnetization of the permanent magnet. This irreversible demagnetization will cause changes in the characteristics of the second AC motor 14 and lower control accuracy in the system voltage stabilization control, torque control and the like, which uses the second AC motor 14. However, this problem is eliminated in the second embodiment by setting the power control vector ip* and the command current vector i2* to the strong magnetic field side.

In the embodiments described above, the torque command value T2* is used as the information on the torque generated by the second AC motor 14. It is to be noted, however, that a torque value estimated on the basis of the operating state of the second AC motor 14 and other data can also be used as the information on the torque generate by the second AC motor 14 in place of the torque command value T2*. Further, in the system voltage stabilization control, a voltage vector may be operated in place of operating the current vector.

In addition, in accordance with the embodiment, in a system for controlling the second AC motor 14 by adoption of the sinusoidal-waveform PWM control method, in execution of the system voltage stabilization control, the current vector is adjusted in order to change only the reactive power contributing none to generation of the torque of the second AC motor 14. In this way, the system voltage is controlled by adjusting the input power of the second AC motor 14 while sustaining the torque generated by the second AC motor 14 at a constant value (that is, the torque command value T2*). Thus, variations in system voltage can be suppressed without adversely affecting the operating state of the electric vehicle.

As described above, in the embodiments, the current vector of the second AC motor 14 is adjusted in order to control the input power of the second AC motor 14 while sustaining the torque generated by the second AC motor 14 at a constant value. It is to be noted, however, that the voltage vector of the second AC motor 14 can also be adjusted in order to control the input power of the second AC motor 14 while sustaining the torque generated by the second AC motor 14 at a constant value.

In addition, in the embodiments, the input power operation quantity Pm for the second AC motor 14 is computed by using a detected value Vsf resulting from the low pass filtering process as the detected value of the system voltage. Thus, the input power operation quantity Pm can be computed by using the detected value Vsf obtained as a result of the low pass filtering process, which is carried out in order to eliminate noise components (or high-frequency components) from the detected value Vs of the of the system voltage. That is, the input power operation quantity Pm can be computed by using the detected value Vsf without noises. As a result, the precision of the computation of the input power operation quantity Pm is improved.

Here, if control is executed to suppress variations in system voltage by adjusting the input power of the second MG unit 30 (or the second AC motor 14), it is possible that there are mutual interferences between control executed by adjusting the input power of the second MG unit 30 as control of the system voltage and control executed by using the voltage boosting converter 21 as control of the system voltage.

In order to cope with such mutual interferences, in the embodiments, the command value Pif* of the conversion power is computed from the total power Pi*, which is obtained as a result of adding the input power Pi1 of the first AC motor 13 to the input power Pi2 of the second AC motor 14. In addition, the target value Vs* (or the detected value Vsf) of the system voltage is multiplied by the detected value icf of the output current of the voltage boosting converter 21 to produce the detected value Pi of the conversion power. Then, the output power of the voltage boosting converter 21 is controlled so as to reduce the difference ΔPi between the command value Pi* and detected value Pi of the conversion power. Thus, it is possible to avoid mutual interferences between control executed by adjusting the input power of the second MG unit 30 (or the second AC motor 14) as control of the system voltage and control executed by using the voltage boosting converter 21 as control of the system voltage.

As described above, in the embodiments, the output power of the voltage boosting converter 21 is controlled so as to reduce the difference ΔPi between the command value Pi* and detected value Pi of the conversion power. It is to be noted, however, that the output power of the voltage boosting converter 21 can also be controlled so as to reduce the difference ΔPi between the command value Pif* and detected value Pi of the conversion power.

In addition, in the embodiments, the total power Pif* of the conversion power is computed as the command value Pif* of the conversion power by carrying out the low pass filtering process on the total power Pi*, which is obtained as a result of adding the input power Pi1 of the first AC motor 13 to the input power Pi2 of the second AC motor 14. Thus, the total power Pif* obtained as a result of the low pass filtering process carried out to eliminate noise components (or high frequency components) of the total power Pi* can be used as the command value Pif* of the conversion power. As a result, the command value Pif* of the conversion power can be set with a high degree of precision.

Specifically, in the embodiments, the detected value Pi of the conversion power is computed by using the filtered detected value, which is obtained as a result of the low pass filtering process and used as the detected value icf of the output current of the voltage boosting converter 21. Thus, the detected value Pi of the conversion power is computed by using the detected value icf obtained as a result of the low pass filtering process carried out to eliminate noise components (or high-frequency components) of the detected value ic of the output current of the voltage boosting converter 21. As a result, the precision of the computation of the detected value Pi of the conversion power is improved.

As described above, in the embodiments, the input power of the second MG unit 30 (or the second AC motor 14) is controlled so as to suppress variations in system voltage. It is to be noted, however, that the input power of the first MG unit 29 (or first AC motor 13) can also be controlled so as to suppress variations in system voltage. Alternatively, in an all-wheel driving configuration including a third MG unit mounted on the dependent wheels, the input power of the third MG unit can also be controlled so as to suppress variations in system voltage.

Furthermore, in the embodiments, the present invention is applied to a hybrid car of the so-called split type of splitting the power of the engine by using a planetary gear set. However, the scope of the present invention is not limited to the hybrid car of the so-called split type. That is, the present invention can also be applied to a hybrid car adopting another method such as a parallel type of a series type. Moreover, in the embodiments, the present invention is applied to a vehicle using AC motors and an engine as power sources. However, the present invention can also be applied to a vehicle employing only AC motors as a power source. In addition, the present invention can also be applied to a vehicle employing only one MG unit comprising an inverter and an AC motor as well as a vehicle employing three or more MG units.

What is claimed is:

1. A control apparatus for an electric vehicle comprising:
   a power converter for converting a voltage supplied by a DC power supply into a system voltage appearing on a power supply line;
   a MG unit as a motor driving unit, the MG unit including (i) an inverter connected to the power supply line and (ii) an AC motor driven by the inverter;
   a system voltage controller for executing system voltage stabilization control by adjusting a power required in generation of a torque in the AC motor employed in the MG unit by an input power different from the power required in generation of a torque in order to suppress variations in the system voltage, the input power being determined to maintain the torque of the AC motor constant; and
   a rotation speed detector for detecting a rotation speed of the AC motor,
   wherein, the system voltage controller selects, during execution of the system voltage stabilization control, a leading side or a lagging side, on which at least one of a current flowing to the AC motor and a voltage applied to the AC motor is to be adjusted, in accordance with at least one of the rotation speed detected by the rotation speed detector and a torque generated in the AC motor.

2. The control apparatus according to claim 1, wherein the system voltage controller selects, during execution of the system voltage stabilization control:
   the leading side, on which a current flowing to the AC motor or a voltage applied to the AC motor is to be adjusted, if the rotation speed of the AC motor is lower than a predetermined speed value and a torque generated in the AC motor is lower than a predetermined torque value; and
   the lagging side, on which the current flowing to the AC motor or the voltage applied to the AC motor is to be adjusted, if the rotation speed of the AC motor is higher than the predetermined speed value or the torque generated in the AC motor is greater than the predetermined torque value.

3. The control apparatus according to claim 1, further comprising:
   a target voltage setting unit for setting a target value of the system voltage;
   a voltage detector for detecting the system voltage; and
   a power operation quantity computation unit for computing a power operation quantity of an input power of the MG unit on the basis of a value set by the target voltage setting unit as the target value and a value detected by the voltage detector as the system voltage,
   wherein the system voltage controller controls the system voltage through adjustment of the input power of the MG unit on the basis of a quantity computed by the power operation quantity computation unit as the power operation quantity.

4. The control apparatus according to claim 3, further comprising:
   a first low frequency component filter for passing only components included in the system voltage detected by the voltage detector as components each having a frequency lower than a predetermined value,
   wherein the power operation quantity computation unit computes a power operation quantity of the input power of the MG unit on the basis of the components passed by the first low frequency component filter as components, which are included in the system voltage as components each having a frequency lower than the predetermined value.

5. The control apparatus according to claim 4, further comprising:
   a conversion power controller for controlling the conversion power, which is the input or output power of the power converter.

6. The control apparatus according to claim 5, further comprising:
   a conversion power command value computation unit for computing a command value of the conversion power of the power converter;
   a conversion power detector for detecting a value as a detected value of the conversion power; and
   a conversion power control quantity computation unit for computing a control quantity of the conversion power on the basis of the value computed by the conversion power command value computation unit as the command value of the converted power and the value detected by the conversion power detector as the detected value of the conversion power,
   wherein the conversion power controller controls the conversion power on the basis of a control quantity computed by the conversion power control quantity computation unit.

7. The control apparatus according to claim 6, wherein:
   the conversion power command value computation unit computes the command value of the conversion power on the basis of a power including at least a sum of input powers of all MG units connected to the power supply line.

8. The control apparatus according to claim 7, further comprising:
   a second low frequency component filter for passing only power components included in the power including at least a total value of input powers of all the MG units connected to the power supply line as components each having a frequency lower than a predetermined value, wherein the conversion power command value computation unit computes the command value of the conversion power on the basis of the power components passed by the second low frequency component filter as power components each having a frequency lower than the predetermined value.

9. The control apparatus according to claim 8, further comprising:
a current detector for detecting an output current of the power converter,
wherein the conversion power detector computes a detected value of the conversion power on the basis of a value set by the target voltage setting unit as the target value of the system voltage or the system voltage detected by the voltage detector and the current detected by the current detector as the output current of the power converter.

10. The control apparatus according to claim 9, further comprising:
a third low frequency component filter for passing only components included in the output current of the power converter as components each having a frequency lower than a predetermined value, wherein the conversion power detector computes a detected value of the conversion power on the basis of the components passed by the third low frequency component filter as output current components each having a frequency lower than a predetermined value.

11. A control apparatus for an electric vehicle comprising:
a power converter for converting a voltage supplied by a DC power supply into a system voltage appearing on a power supply line;
a MG unit as a motor driving unit, the MG unit including (i) an inverter connected to the power supply line and (ii) an AC motor driven by the inverter; and
a system voltage controller for executing system voltage stabilization control by adjusting a power required in generation of a torque in the AC motor employed in the MG unit by an input power different from the power required in generation of a torque in order to suppress variations in the system voltage, the input power being determined to maintain the torque of the AC motor constant;
wherein the system voltage controller sets, during execution of the system voltage stabilization control, at least one of a current flowing to the AC motor and a voltage applied to the AC motor to a strong magnetic field side, when a torque generated by the AC motor is substantially zero.

12. The control apparatus according to claim 11, further comprising:
a target voltage setting unit for setting a target value of the system voltage; and
a voltage detector for detecting the system voltage,
wherein the system voltage controller computes a power operation quantity of an input power of the MG unit on the basis of a value set by the target voltage setting unit as the target value and a value detected by the voltage detector as the system voltage, and controls the system voltage through adjustment of the input power of the MG unit.

13. The control apparatus according to claim 12, further comprising:
a low frequency component filter for passing only components included in the system voltage detected by the voltage detector as components each having a frequency lower than a predetermined value,
wherein the system voltage controller computes the power operation quantity of the input power of the MG unit on the basis of the components passed by the low frequency component filter as components, which are included in the system voltage as components each having a frequency lower than the predetermined value.

14. The control apparatus according to claim 11, further comprising:
a conversion power controller for controlling the conversion power, which is the input or output power converter.

15. The control apparatus according to claim 14, further comprising:
a conversion power command value computation unit for computing a command value of the conversion power of the power converter; and
a conversion power detector for detecting a value as a detected value of the conversion power,
wherein the conversion power controller computes a control quantity of the conversion power on the basis of the value computed by the conversion power command value computation unit as the command value of the converted power and the value detected by the conversion power detector as the detected value of the conversion power, and controls the conversion power on the basis of the control quantity computed by the conversion power control quantity computation unit.

16. The control apparatus according to claim 15, wherein:
the conversion power command value computation unit computes the command value of the conversion power on the basis of input powers of all electric loads including the MG unit connected to the power supply line.

17. The control apparatus according to claim 16, further comprising:
a low frequency component filter for passing only power components in the input powers of the all electric loads as components each having a frequency lower than a predetermined value,
wherein the conversion power command value computation unit computes the command value of the conversion power on the basis of the power components passed by the low frequency component filter as power components each having a frequency lower than the predetermined value.

18. The control apparatus according to claim 15, further comprising:
at least one of a target voltage setting unit for setting a target value of the system voltage and a voltage detector for detecting the system voltage; and
a current detector for detecting an output current of the power converter,
wherein the conversion power detection detector computes a detected value of the conversion power on the basis of a value set by the target voltage setting unit as the target value of the system voltage or the system voltage detected by the voltage detector and the current detected by the current detector as the output current of the power converter.

19. The control apparatus according to claim 18, further comprising:
a low frequency component filter for passing only components included in the output current of the power converter as components each having a frequency lower than a predetermined value,
wherein the conversion power detector computes a detected value of the conversion power on the basis of the components passed by the low frequency component filter as output current components each having a frequency lower than a predetermined value.

20. The control apparatus according to claim 11, further comprising:
a rotation speed detector for detecting a rotation speed of the AC motor, wherein the system voltage controller selects, during execution of the system voltage stabilization control, a leading side or a lagging side, on which at least one of the current flowing to the AC motor and the voltage applied to the AC motor is to be adjusted, in accordance with at least one of the rotation speed detected by the rotation speed detector and the torque generated in the AC motor, when the torque generated by the AC motor is not substantially zero.

* * * * *